May 31, 1932.  G. A. PETTIT  1,860,594
MOSS GATHERER
Filed Nov. 4, 1929
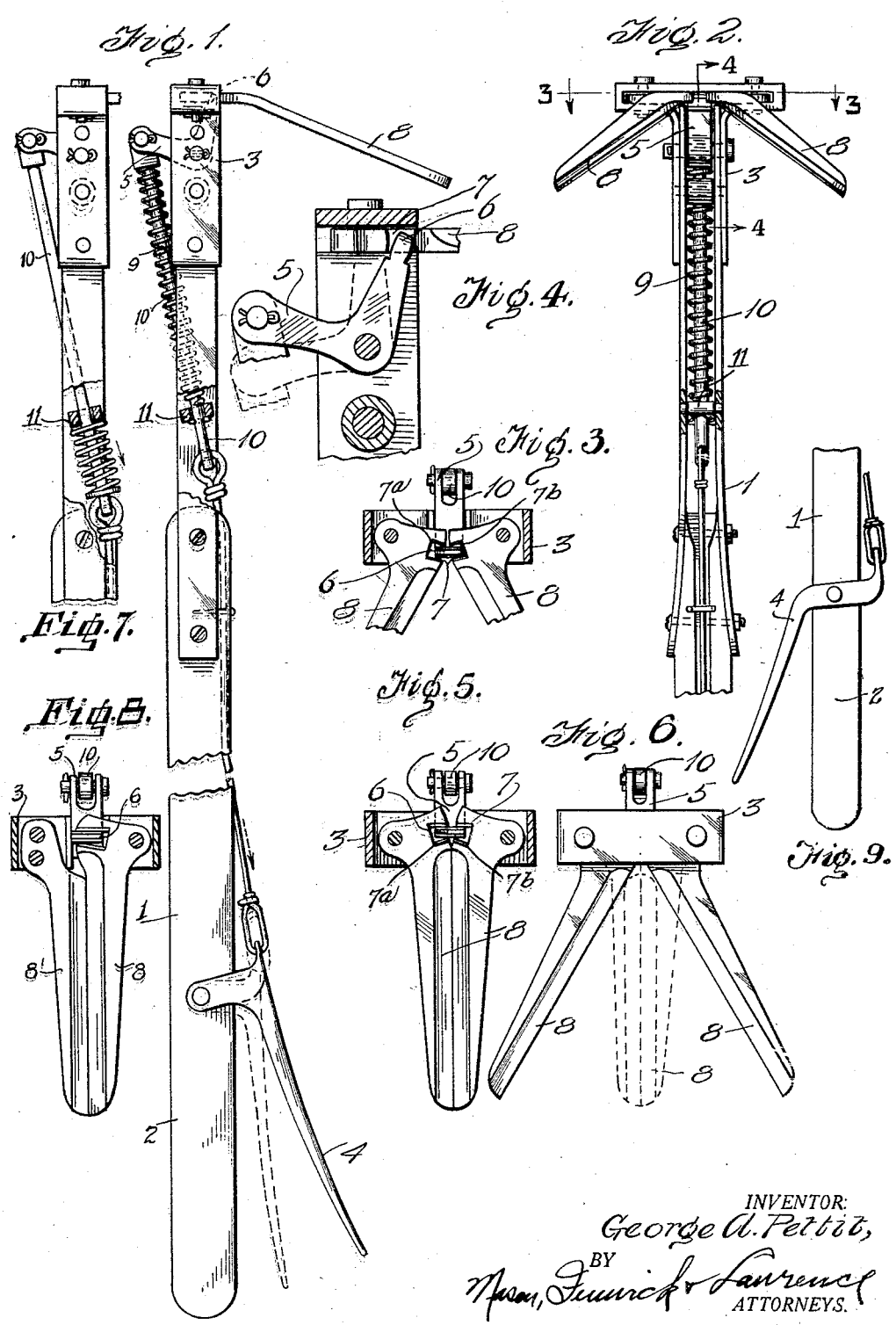
INVENTOR:
George A. Pettit,
BY
Mason, Fenwick & Lawrence
ATTORNEYS.

Patented May 31, 1932

1,860,594

UNITED STATES PATENT OFFICE

GEORGE A. PETTIT, OF NEW ORLEANS, LOUISIANA

MOSS GATHERER

Application filed November 4, 1929. Serial No. 404,831.

My invention relates to improvements in moss gatherers and is designed to overcome the objections to moss pullers or gatherers heretofore designed wherein a hook or teeth are employed to engage the moss in removing the same from a tree; no teeth being employed in the gripping element of my tool to tear the moss or to permit some of it to remain on the tree when the gripper clamps the moss, or to cling to the implement after being removed from the tree.

In the accompanying drawings:

Figure 1 is a side elevation of my improved moss gatherer or puller;

Figure 2 is a front view of the puller portion of the same;

Figure 3 is a horizontal section on the line 3—3 of Figure 2;

Figure 4 is a vertical section on the line 4—4 of Figure 2;

Figure 5 is a view similar to Figure 3, but with the gripping arms shown in a closed position;

Figure 6 is a top view with the gripping arms open as in Figure 3;

Figure 7 is a modified form showing in side elevation, an arrangement of the spring in which the jaws are held normally closed, and Figure 8 is a section taken in a plane similar to that of Figure 5, showing a modified form in which one jaw only is pivoted, the other being stationary, Fig. 9 is a fragmentary elevation of the handle end of the device with operating lever 4 on the side opposite to that shown in Fig. 1.

In the drawings, the reference character 1 represents a rod or pole of suitable length to enable the operator to stand on the ground or on an elevation and remove moss, such as Spanish moss, from trees.

The pole or rod is shaped at its lower end to constitute a handle or gripping portion 2, and at its upper end carries a bifurcated head 3, attached thereto in a suitable manner for supporting the moss removing gripping mechanism.

Pivoted to the handle or gripping portion 2 is an operating lever 4 which is connected to a bell crank, 5, which latter is pivoted in the bifurcated head or bracket 3. The end 6 of the bell crank 5 operates in a slot 7, Figures 3, 4 and 5 formed by bringing the upper ends of the moss clamping jaws 8 into juxtaposition or alignment, said upper jaw ends being formed with notches 7a and 7b which are in alignment with each other and which together constitute the slot 7. The clamping jaws 8 are pivoted at their upper ends to the head of the implement and the outer ends of said jaws are held normally open by means of a spring 9, see Figures 1 and 2, surrounding the connecting rod 10 and reacting against an abutment 11. By pressing down on the pivoted handle 4, which is secured to the operating rod 10, said rod being connected at its upper end to the bell crank 5, the clamping jaws 8 will be brought together as shown in Figure 5 to grasp a bunch of moss hanging from a tree. Upon pulling downward upon the implement the moss will be removed from the tree and held firmly between the clamping jaws 8 without liability of the moss being torn or only partly removed from the tree.

To release the moss from the clamping jaws, it is only necessary for the operator to remove the pressure of his hand on the pivoted lever 4, whereupon the said pivoted lever will spring out to its normal position and the jaws 8 will be opened so that the moss will readily drop from the clamping jaws on to the ground or into a suitable receptacle.

The moving of the upper end of the bell crank through the slot 7 formed by the recesses or notches in the upper ends of the clamping jaws 8, is unique and practical; the upper end of the bell crank which works in said slot moves said pivoted jaws so as to bring the lower ends together to firmly clasp or grip the moss; and upon the release of the spring actuated by the handle 4, a reverse movement will be imparted to the bell crank and the clamping jaws open and the moss is readily discharged from the clamping jaws. The movement of the jaws is thus positive in both directions, and the spring which releases the jaws is remote from the jaws and, therefore, unlikely to become entangled with the moss. The clamping jaws or members being pivoted at right angles to the handle and the jaws being slightly inclined downward, allow for the easy and instant release of the moss after it is pulled loose from the tree.

This construction and arrangement are very important in order to easily clasp the moss hanging from a tree between the jaws or clamping members, as it can readily be seen that with the moss hanging from the tree in its natural position, and by my device being held in an upright or vertical position in reaching for the moss, the open jaws can readily be placed against the clusters of moss in exactly the proper alignment to clasp or grip the same when closed.

This feature of my invention, namely, having the gripping members or jaws operating at approximately right angles to the pole, the ends of the same slightly inclined downwardly and outwardly, is very important.

A slight modification of the invention is shown in Figure 8, one jaw 8, alone being pivoted, while the other jaw 8' remains fixed. In this construction, the slot 7 is made deeper to receive the entire width of the end of the bell crank.

Figure 7 shows the spring on the opposite side of the abutment 11, so that it biases the rod 10 downward, closing the jaws, its effect being just the opposite to that arrangement shown in Figure 1. This action of the spring makes it necessary to place the operating lever 4 on the opposite side of the pole to the lower end of the operating rod as shown in Fig. 9 so that pressure of the operating lever forces the operating rod upwardly, opening the jaws.

It is obvious that by sharpening the edges where they meet, as in Figure 5, the object grasped may be cut off.

In the operation of my device, a very slight movement of the operating rod (approximately ½ inch) is all that is necessary to open and close the gripping element or jaws, which have a spread when open, of several inches (approximately 5½ inches). This feature of getting a 5½ inch opening of the gripping elements or jaws by only moving the operating rod ½ inch is important, and an improvement over the art, as it permits of the use of the simple type of operating handle shown in the drawings.

The operating rod in my device passes through a groove in the handle and is held in place by staples. This arrangement permits holding the pole in the hand at any portion of its length without the hand touching or interfering with the movement of the operating rod. In some moss gathering implements heretofore produced, the device is manually operated in both opening and closing the gripping jaws, while in my device, the gripping or clamping jaws are opened instantly and automatically by means of a spring, the snap of the spring tending forcibly to discharge the moss.

It is important that when a cluster of moss is pulled from a tree and is released by the gripping mechanism, that all the moss falls to the ground or into a receptacle and that it does not cling to the gathering tool, as frequently happens where teeth are employed in an implement of this kind.

In my device, it will be observed that the gripping or clamping members or jaws are pivoted at right angles to the handle and that the jaws are slightly inclined downward. This is for the specific purpose of accomplishing the easy and instant release of the moss after it is pulled loose from the tree, so that it will drop at once to the ground.

Having now described my invention, what I claim is:

1. A moss gathering implement comprising a suitable pole carrying a supporting head, clamping jaws pivoted to said head each having a notch facing the other, a bell crank pivoted to the head having one end in the notches to close and open the jaws, a spring actuated operating rod connected to the other end of the bell crank and a handle pivoted on the pole and connected to the lower end of the operating rod, so that by pressing on the handle, the clamping jaws will be brought together to grip a cluster of moss, and upon being released the jaws will be automatically opened and the moss released.

2. A moss gathering implement, in combination with a pole carrying a supporting head, clamping jaw mechanism pivoted to said head at substantial right angles to the pole; the jaw mechanism when opened flaring outwardly and downwardly for the ready release of the gathered moss, and having means of opening and closing the clamping jaws operable from adjacent the other end of the pole.

3. A moss gathering implement, comprising a pole; a bracket at the top of the pole; a bell crank pivoted to the bracket, having an outward extending and an upward extending arm; a clamp pivoted to the bracket to swing into two positions, having a notch embracing the upward extending arm; a hand grip pivoted near the bottom of the pole; a rod connecting the hand grip and the outward extending arm; and a spring holding the clamp normally in one position, so that pressure on the hand grip shall reverse its position.

4. A moss gathering implement, comprising a pole; a bracket at the top of the pole; a bell crank pivoted to the bracket, having an outward extending and an upward extending arm; a pair of clamps pivoted to the bracket to swing into two positions, each having a notch facing the other with the upward extending arm in the two notches; a hand grip pivoted near the bottom of the pole; a rod connecting the hand grip and the outward extending arm; and a spring actuating the bell crank to hold the clamps normally in one position, so that pressure on the hand grip shall reverse their position.

5. A moss gathering implement, comprising the same structure as claim 4, with the clamps bent downward to facilitate release of the gathered moss.

In testimony whereof I affix my signature.

GEORGE A. PETTIT.